United States Patent
Song et al.

(10) Patent No.: US 11,694,549 B2
(45) Date of Patent: Jul. 4, 2023

(54) APPARATUS AND METHOD FOR PROVIDING CUSTOMIZED TRAFFIC GUIDANCE SERVICE

(71) Applicant: ELECTRONICS AND TELECOMMUNICATIONS RESEARCH INSTITUTE, Daejeon (KR)

(72) Inventors: Yoo-Seung Song, Daejeon (KR); Kyoung-Wook Min, Daejeon (KR); Jeong-Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 63 days.

(21) Appl. No.: 17/327,067

(22) Filed: May 21, 2021

(65) Prior Publication Data

US 2022/0092977 A1    Mar. 24, 2022

(30) Foreign Application Priority Data

Sep. 23, 2020    (KR) .................. 10-2020-0122803

(51) Int. Cl.
    *G08G 1/09*    (2006.01)
    *G08G 1/0967*    (2006.01)
    (Continued)

(52) U.S. Cl.
    CPC ....... *G08G 1/096741* (2013.01); *G08G 1/091* (2013.01); *H04W 4/021* (2013.01);
    (Continued)

(58) Field of Classification Search
    CPC .. G08G 1/096741; G08G 1/091; G08G 1/162; G08G 1/166; H04W 4/021; H04W 4/06; H04W 4/44; H04W 4/90
    (Continued)

(56) References Cited

U.S. PATENT DOCUMENTS 10,672,270 B2 *    6/2020    Kim ..................... G05D 1/0214
11,017,670 B2 *    5/2021    Cunningham ........ B60W 40/06
(Continued)

FOREIGN PATENT DOCUMENTS

KR    20100132581 A    12/2010
KR    101464708 B1    11/2014

OTHER PUBLICATIONS

3rd Generation Partnership Project; Technical Specification Group Services and System Aspects; Study on enhancement of 3GPP Support for 5G V2X Services (Release 16), Dec. 2018, pp. 1-76, 3GPP TR 22.886 V16.2.0.

*Primary Examiner* — Tai T Nguyen

(57) ABSTRACT

Disclosed herein are an apparatus and method for providing a customized traffic guidance service. The method may include acquiring data about one or more nearby objects, detecting surrounding traffic conditions based on the data about the nearby objects, determining whether to provide a customized traffic guidance service, selecting one or more target objects to which the customized traffic guidance service is to be provided and guidance information to be provided to each of the target objects, generating a customized traffic guidance message for the selected guidance information, and transmitting the customized traffic guidance message to the corresponding target object.

20 Claims, 7 Drawing Sheets

(51) Int. Cl.
  *H04W 4/44* (2018.01)
  *H04W 4/06* (2009.01)
  *H04W 4/90* (2018.01)
  *H04W 4/021* (2018.01)
(52) U.S. Cl.
  CPC .............. *H04W 4/06* (2013.01); *H04W 4/44* (2018.02); *H04W 4/90* (2018.02)
(58) Field of Classification Search
  USPC ........................................................ 340/905
  See application file for complete search history.

(56) References Cited

U.S. PATENT DOCUMENTS

| | | | |
|---|---|---|---|
| 2015/0066350 A1* | 3/2015 | Iwata | G08G 1/096716 |
| | | | 701/400 |
| 2017/0028913 A1 | 2/2017 | Bijlani et al. | |
| 2021/0394752 A1* | 12/2021 | Satoh | B60W 30/09 |

\* cited by examiner

APPARATUS AND METHOD FOR PROVIDING CUSTOMIZED TRAFFIC GUIDANCE SERVICE

CROSS REFERENCE TO RELATED APPLICATION

This application claims the benefit of Korean Patent Application No. 10-2020-0122803, filed Sep. 23, 2020, which is hereby incorporated by reference in its entirety into this application.

BACKGROUND OF THE INVENTION

1. Technical Field

The disclosed embodiment relates to technology for providing a cooperative intelligent transportation service using vehicle communication.

2. Description of the Related Art

Conventional vehicle communication technology, which started with a 'Hi-Pass' service for paying highway tolls using Dedicated Short-Range Communication (DSRC) technology, has gradually expanded and advanced to the recent cooperative intelligent transportation system.

The cooperative intelligent transportation system uses vehicle communication technology, digital signage technology, and the like in order to collect information about objects present in a road traffic environment and to improve the safety and convenience of users.

As representative safety services using vehicle communication technology, there are the provision of traffic signal information, guidance on safe speed on a curved road, guidance on safe passage at the intersection, and the like, which are examples of services using Vehicle-to-Infrastructure (V2I) communication, and a sudden-stop alert, a forward collision alert, safe lane-change assistance, and the like, which are examples of services using Vehicle-to-Vehicle (V2V) communication. Also, various other services, such as provision of weather information, road management, vehicle management, vehicle software updates, and the like, are available.

However, the cooperative intelligent transportation system and the use case thereof are configured such that most safety services are provided to all recipients located in a specific region by broadcasting or multicasting warning messages thereto. Service limitedly provided to a specific vehicle is provided in the form of a response upon receiving an IP-based request.

When there is a possibility of multiple different accidents simultaneously occurring in a complex urban environment, safety messages can be unnecessarily delivered to nearby users, even when they are not related to the corresponding event. The warning service causing a user to receive an irrelevant message may result in another accident, so it is required to filter the same. Also, it is necessary to maximize safety and convenience by delivering a specific safety message for a specific situation to a relevant user.

[Documents of Related Art]
(Patent Document 1) Korean Patent Application Publication No. 10-2013-0160921.

SUMMARY OF THE INVENTION

The disclosed embodiment provides an apparatus and method for providing a customized traffic guidance service capable of maximizing the effectiveness, safety, and reliability thereof by preventing a traffic guidance message from being transmitted to irrelevant vehicles.

The disclosed embodiment provides an apparatus and method for providing a customized traffic guidance service capable of maximizing safety and convenience by delivering a specific traffic guidance service message based on traffic conditions to a corresponding user.

A method for providing a customized traffic guidance service according to an embodiment may include acquiring data about one or more nearby objects, detecting surrounding traffic conditions based on the data about the nearby objects, determining whether to provide a customized traffic guidance service, selecting one or more target objects to which the customized traffic guidance service is to be provided and guidance information to be provided to each of the target objects, generating a customized traffic guidance message for the selected guidance information, and transmitting the customized traffic guidance message to the corresponding target object.

Here, acquiring the data about the one or more nearby objects may include acquiring first object data based on sensing data acquired using at least one sensor, and determining whether to provide the customized traffic guidance service may be configured to determine whether to provide the customized traffic guidance service based on the first object data.

Here, the at least one sensor may be at least one of sensors including a camera, LiDAR and radar.

Here, acquiring the data about the one or more nearby objects may include acquiring first object data including location information pertaining to each of one or more objects based on the sensing data acquired using the at least one sensor; acquiring second object data including location information and address information pertaining to each of one or more objects that transmit messages received by a communication unit; and synchronizing the first object data with the second object data based on the location information. Selecting the one or more target objects and the guidance information may include acquiring address information pertaining to each of the target objects based on the result of synchronization.

Here, the address information may include a MAC address or an IP address.

Here, the first object data may be generated as a profile in which a first unique identifier is assigned to each of the one or more objects of the first object data, the second object data may be generated as a profile in which a second unique identifier is assigned to each of the one or more objects of the second object data, and synchronizing the first object data with the second object data may include determining whether the object of the first object data is the same as the object of the second object data based on the location information changing over time, which is included in the first object data and the second object data, and generating a profile by assigning a third unique identifier to the first object data and the second object data corresponding to the same object.

Here, the first object data and the second object data may further include the types of the objects and the motion information thereof, and determining whether the object of the first object data is the same as the object of the second object data may be configured to determine whether the object of the first object data is the same as the object of the second object data based on the types of the objects and the motion information thereof.

Here, transmitting the customized traffic guidance message may be configured to transmit the customized traffic guidance message to the corresponding target object in a unicast or multicast manner.

An apparatus for providing a customized traffic guidance service according to an embodiment may include memory in which at least one program is recorded and a processor for executing the program. The program may perform acquiring data about one or more nearby objects, detecting surrounding traffic conditions based on the data about the nearby objects, determining whether to provide a customized traffic guidance service, selecting one or more target objects to which the customized traffic guidance service is to be provided and guidance information to be provided to each of the target objects, generating a customized traffic guidance message for the selected guidance information, and transmitting the customized traffic guidance message to the corresponding target object.

Here, acquiring the data about the one or more nearby objects may include acquiring first object data based on sensing data acquired using at least one sensor, and determining whether to provide the customized traffic guidance service may be configured to determine whether to provide the customized traffic guidance service based on the first object data.

Here, the at least one sensor may be at least one of sensors including a camera, LiDAR and radar.

Here, acquiring the data about the one or more nearby objects may include acquiring first object data including location information pertaining to each of one or more objects based on the sensing data acquired using the at least one sensor; acquiring second object data including location information and address information pertaining to each of one or more objects that transmit messages received by a communication unit; and synchronizing the first object data with the second object data based on the location information. Selecting the one or more target objects and the guidance information may include acquiring address information pertaining to each of the target objects based on the result of synchronization.

Here, the address information may include a MAC address or an IP address.

Here, the first object data may be generated as a profile in which a first unique identifier is assigned to each of the one or more objects of the first object data, the second object data may be generated as a profile in which a second unique identifier is assigned to each of the one or more objects of the second object data, and synchronizing the first object data with the second object data may include determining whether the object of the second object data based on the location information changing over time, which is included in the first object data and the second object data, and generating a profile by assigning a third unique identifier to the first object data and the second object data corresponding to the same object.

Here, the first object data and the second object data may further include the types of the objects and the motion information thereof, and determining whether the object of the first object data is the same as the object of the second object data may be configured to determine whether the object of the first object data is the same as the object of the second object data based on the types of the objects and the motion information thereof.

Here, transmitting the customized traffic guidance message may be configured to transmit the customized traffic guidance message to the corresponding target object in a unicast or multicast manner.

A method for providing a customized traffic guidance service according to an embodiment may include acquiring first object data for each of one or more objects recognized based on sensing data acquired using at least one sensor, detecting surrounding traffic conditions based on the first object data, determining whether to provide a customized traffic guidance service, selecting one or more target objects to which the customized traffic guidance service is to be provided and guidance information to be provided to each of the target objects, acquiring second object data including location information and address information pertaining to each of one or more objects that transmit messages received by a communication unit, synchronizing the first object data with the second object data based on the location information, acquiring the address information of each of the target objects based on the result of synchronization, generating a customized traffic guidance message for the selected guidance information, and transmitting the customized traffic guidance message to the address information of the corresponding target object.

Here, the first object data may be generated as a profile in which a first unique identifier is assigned to each of the one or more objects of the first object data, the second object data may be generated as a profile in which a second unique identifier is assigned to each of the one or more objects of the second object data, and synchronizing the first object data with the second object data may include determining whether the object of the first object data is the same as the object of the second object data based on the location information changing over time, which is included in the first object data and the second object data, and generating a profile by assigning a third unique identifier to the first object data and the second object data corresponding to the same object.

Here, the first object data and the second object data may further include the types of the objects and the motion information thereof, and determining whether the object of the first object data is the same as the object of the second object data may be configured to determine whether the object of the first object data is the same as the object of the second object data based on the types of the objects and the motion information thereof.

Here, transmitting the customized traffic guidance message may be configured to transmit the customized traffic guidance message to the address information of the corresponding target object in a unicast or multicast manner.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
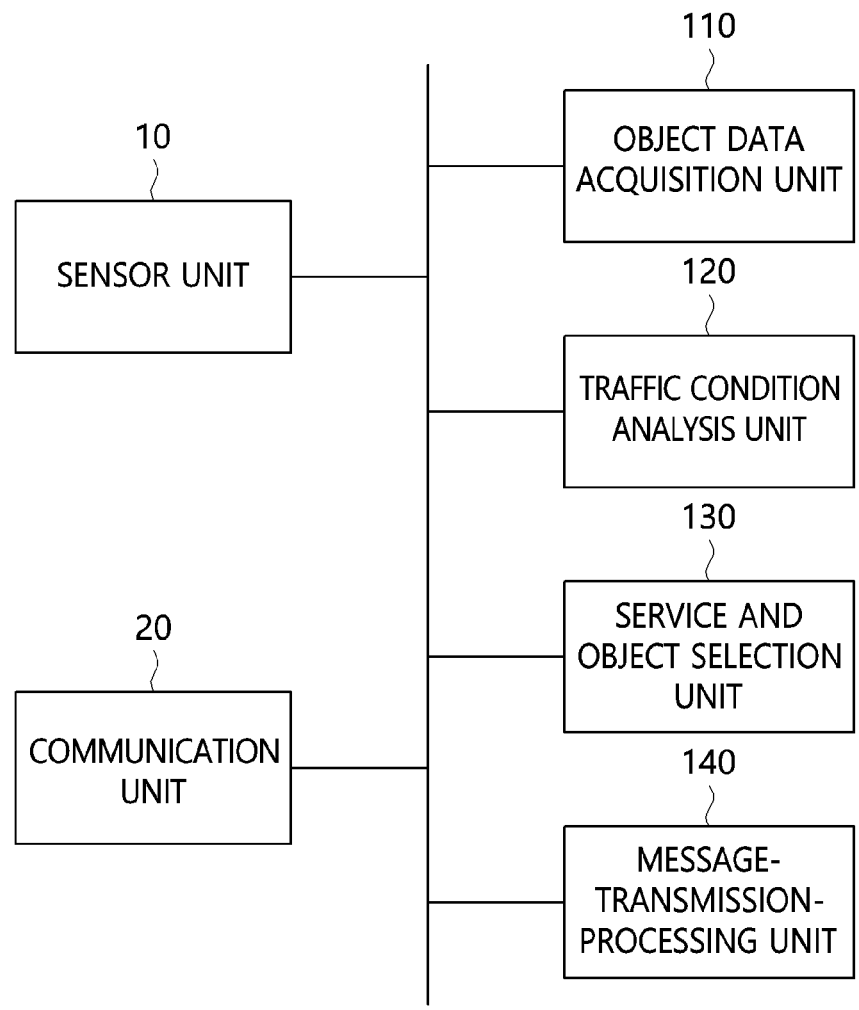
FIG. 1 is a schematic block diagram of an apparatus for providing a customized traffic guidance service according to an embodiment.

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, an apparatus and method for providing a customized traffic guidance service according to an embodiment will be described in detail with reference to FIGS. 1 to 9.

FIG. 1 is a schematic block diagram of an apparatus for providing a customized traffic guidance service according to an embodiment.

The apparatus for providing a customized traffic guidance service according to an embodiment provides a customized traffic guidance service to a vehicle, and may be implemented in infrastructure installed on roads, or may be implemented by being installed in the vehicle.

Referring to FIG. 1, the apparatus for providing a customized traffic guidance service according to an embodiment may include a sensor unit 10, a communication unit 20, an object data acquisition unit 110, a traffic condition analysis unit 120, a service and object selection unit 130, and a message-transmission-processing unit 140.

According to an embodiment, the sensor unit 10 may include at least one of a camera, LiDAR, and radar.

According to another embodiment, the sensor unit 10 may be multiple sensors including two or more of a camera, LiDAR, and radar. That is, the sensor unit 10 may acquire images capturing nearby objects or 2D/3D point information pertaining thereto.

The communication unit 20 connected with another vehicle or an infrastructure device in a wireless manner may receive a message therefrom, or may deliver a written message thereto.

That is, the sensor unit 10 may serve as the eyes of a driver, and the communication unit 20 may serve as the ears of the driver. Accordingly, the apparatus for providing a customized traffic guidance service according to an embodiment may provide customized traffic guidance to each vehicle as if a traffic officer were controlling the traffic flow of vehicles using hand signals based on traffic conditions detected by comprehensively analyzing data obtained from his/her eyes and ears.

The object data acquisition unit 110 may acquire data about at least one nearby object. This will be described in detail later with reference to FIG. 2 and FIG. 3.

The traffic condition analysis unit 120 detects surrounding traffic conditions based on the data about the nearby object, which is acquired by the object data acquisition unit 110, and determines whether to provide a customized traffic guidance service. That is, the traffic condition analysis unit 120 determines whether an event for which a customized traffic guidance service has to be provided, such as a dangerous situation or the like, is occurring based on the result of detection of the surrounding traffic conditions.

The service and object selection unit 130 selects the traffic guidance service that has to be provided and at least one target object to receive the traffic guidance service when the traffic condition analysis unit 120 determines that it is necessary to provide a customized traffic guidance service. This will be described in detail later with reference to FIG. 4.

The message-transmission-processing unit 140 generates a customized traffic guidance message for the selected guidance service and transmits the same to the corresponding target object. This will be described in detail later with reference to FIG. 5.

Figure 2:
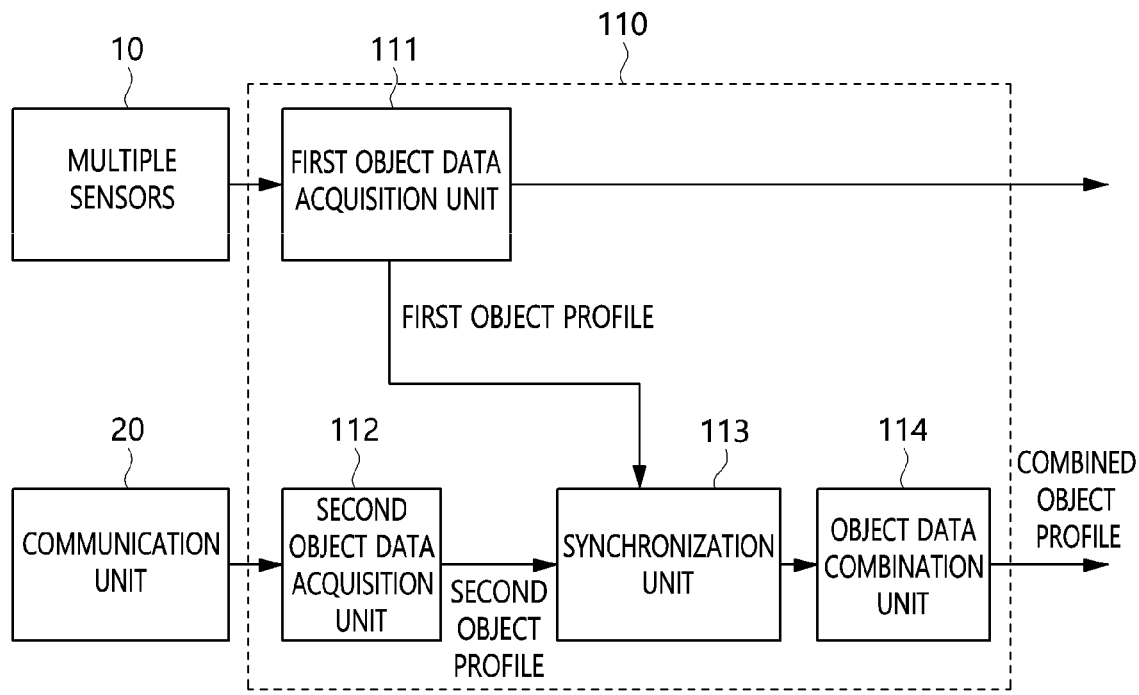
FIG. 2 is a detailed block diagram of an object data acquisition unit according to an embodiment.
Figure 3:
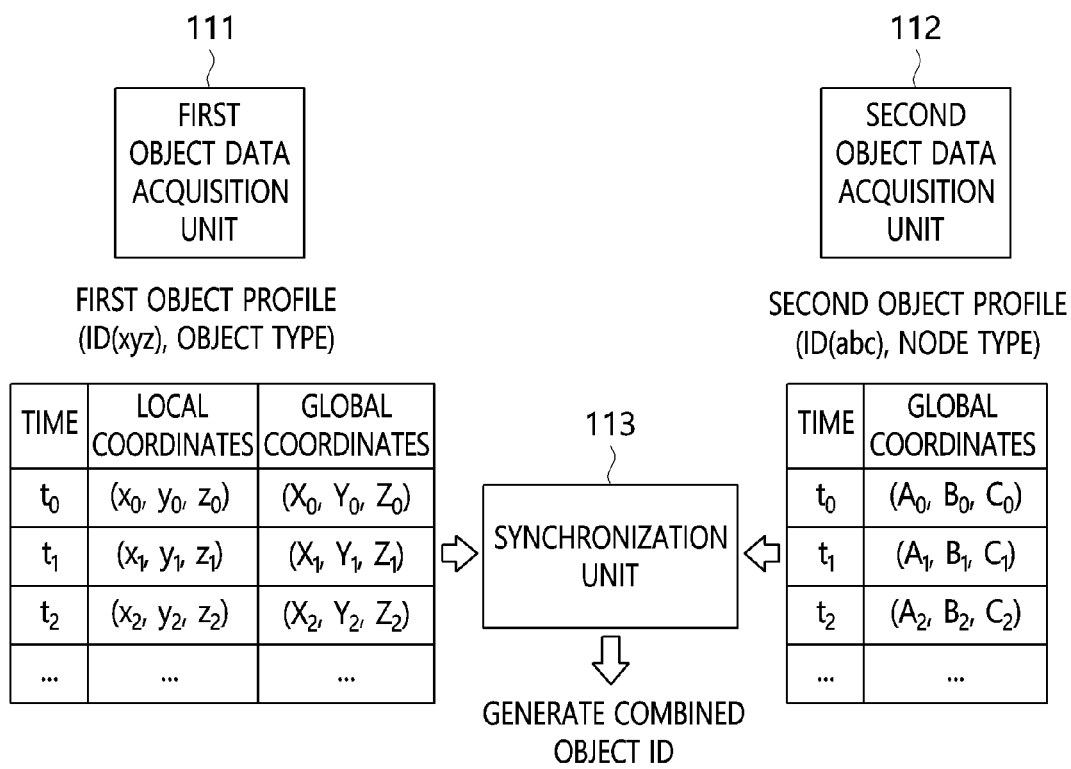
FIG. 3 is a view for explaining an object data synchronization process according to an embodiment.

FIG. 2 is a detailed block diagram of an object data acquisition unit according to an embodiment, and FIG. 3 is a view for explaining an object data synchronization process according to an embodiment.

Referring to FIG. 2, the object data acquisition unit 110 may include a first object data acquisition unit 111, a second object data acquisition unit 112, a synchronization unit 113, and an object data combination unit 114.

The first object data acquisition unit 111 may acquire first object data including location information pertaining to each of one or more objects based on sensing data acquired using at least one sensor 10. That is, the first object data acquisition unit 111 may recognize nearby objects based on the sensing data acquired by the senor unit 10.

Here, the sensor 10 may be multiple sensors including two or more of a camera, LiDAR, and radar. That is, the sensor 10 may acquire images capturing nearby objects or 2D/3D point information pertaining thereto.

Here, the first object data may further include at least one of the type of the object, the size thereof, and motion information pertaining thereto, as well as the location information. Here, the motion information may include the direction in which the object is moving, speed information, such as acceleration or deceleration, and the like. The first object data may be generated and managed as a first object profile by assigning a first unique identifier (ID) thereto.

The first object data acquisition unit 111 delivers the first object profile to the traffic condition analysis unit 120 and the synchronization unit 113 so as to be used therein.

The second object data acquisition unit 112 may acquire second object data including location information and address information pertaining to each of one or more objects that transmit the messages received by the communication unit 20.

Here, the address information may include a MAC address or an IP address.

That is, objects, such as nearby vehicles and the like, may transmit a safety message to the vicinity thereof at predetermined intervals. For example, the objects may broadcast a Basic Safety Message (BSM) (a Hello message) at an interval of 10 Hz. Through the basic safety message transmitted by one or more nearby objects, the second object data acquisition unit 112 may acquire data pertaining to the objects.

Here, the second object data may further include at least one of the type of the object and motion information pertaining thereto, as well as the location information and the address information. Here, the motion information may include the direction in which the object is moving, speed information such as acceleration or deceleration, and the like. The second object data may be generated and managed as a second object profile by assigning a second unique identifier (ID) thereto.

The synchronization unit 113 may synchronize the first object data with the second object data based on the location information.

Here, according to an embodiment, the synchronization unit 113 determines whether the first object data and the second object data pertain to the same object based on the location information, which changes over time.

Referring to FIG. 3, when the coordinate information of an object in the first object data and the coordinate information of an object in the second object data, which are acquired at the same time, are the same as each other, it may be determined that the object in the first object data is the same as the object in the second object data.

Here, according to another embodiment, the synchronization unit 113 may determine whether the objects are the same as each other based on the types thereof and motion information pertaining thereto, as well as the location information changing over time. That is, even though the first object data and the second object data pertain to the objects at the same location, when the types of the objects, the speeds thereof, or the directions in which they are moving are different from each other, it may be determined that the object corresponding to the first object data is not the same as the object corresponding to the second object data.

Here, the synchronization unit 113 assigns a third unique identifier to the first object data and the second object data corresponding to the same object, thereby generating a profile thereof. That is, the third unique identifier may be the combined object ID of a combination of the first object data and the second object data.

Accordingly, the first object profile and the second object profile may be integrated into the combined object profile, to which the third unique identifier is assigned.

Figure 4:
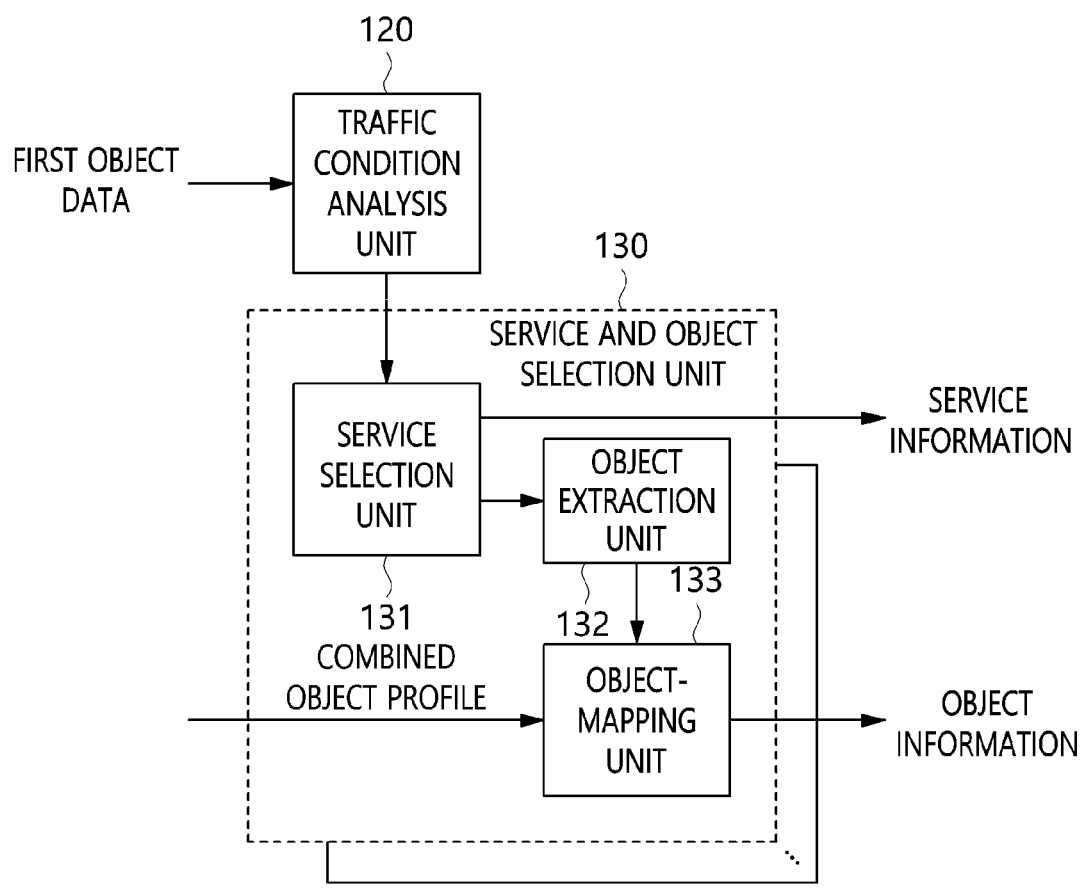
FIG. 4 is a detailed block diagram of a service and object selection unit according to an embodiment.

FIG. 4 is a detailed block diagram of a service and object selection unit according to an embodiment.

Referring to FIG. 4, the service and object selection unit 130 may include a service selection unit 131, an object extraction unit 132, and an object-mapping unit 133.

The service selection unit 131 selects the type of the traffic guidance service to be provided to at least one target object.

Here, the traffic guidance service may include various traffic guidance services including vehicle collision prevention, lane change assistance, and overspeed warning.

The object extraction unit 132 selects at least one object to which the selected traffic guidance service is to be provided. Here, the first unique ID of the object selected based on the first object data may be extracted and delivered to the object-mapping unit 133.

The object-mapping unit 133 maps the service target object, selected by the object extraction unit 132, to one of the objects included in the combined object profile delivered from the object data acquisition unit 110. Here, the first unique identifier of the service target object may be mapped to the corresponding third unique identifier.

Figure 5:
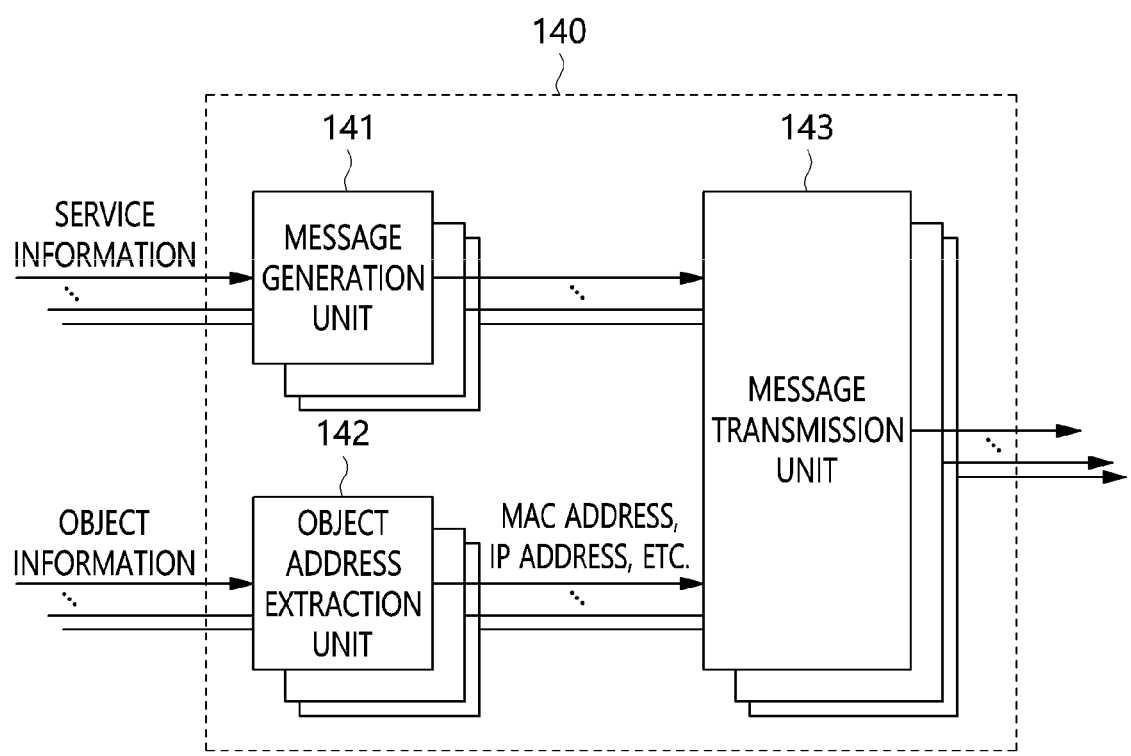
FIG. 5 is a schematic block diagram of a message-transmission-processing unit according to an embodiment.

FIG. 5 is a schematic block diagram of a message-transmission-processing unit according to an embodiment.

Referring to FIG. 5, the message-transmission-processing unit 140 may include a message generation unit 141, an object address extraction unit 142, and a message transmission unit 143.

The message generation unit 141 generates a customized traffic guidance message including guidance information corresponding to a service. Here, when specific services are different for respective objects, as shown in FIG. 5, customized traffic guidance messages for the respective objects may be generated through parallel processing.

The object address extraction unit 142 extracts address information, namely, the MAC address or the IP address, of the selected object, and transmits the same to the message transmission unit 143.

The message transmission unit 143 transmits the generated customized traffic guidance message to the address of the selected object through the communication unit 20.

Because a conventional safety message is transmitted in a broadcast manner, the reception MAC address (RA) thereof is set to 'F', such that all nearby vehicles can receive the safety message. However, a customized traffic guidance message according to an embodiment may be transmitted after the reception address thereof is set to the MAC address of the selected object.

Here, the message transmission unit 143 may transmit the customized traffic guidance message to the corresponding object in a unicast or multicast manner. That is, according to an embodiment, the customized traffic guidance service is provided to an individual user, or is collectively provided to a group of users when the service is provided to all of the users, whereby the effectiveness, safety, and reliability of the service may be maximized.

Figure 6:
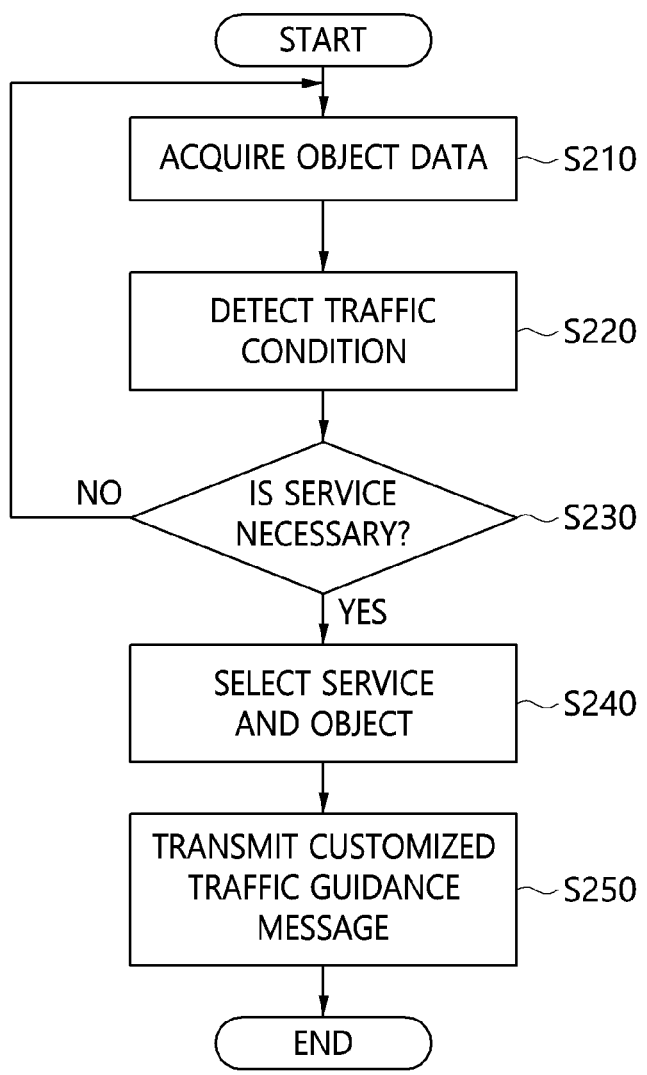
FIG. 6 is a flowchart for explaining a method for providing a customized traffic guidance service according to an embodiment.

FIG. 6 is a flowchart for explaining a method for providing a customized traffic guidance service according to an embodiment.

Referring to FIG. 6, the method for providing a customized traffic guidance service according to an embodiment may include acquiring data about one or more nearby objects at step S210, detecting surrounding traffic conditions based on the data about the nearby objects, and determining whether to provide a customized traffic guidance service at steps S220 to S230, selecting one or more target objects to which the customized traffic guidance service is to be provided and the guidance service to be provided to each of the target objects at step S240, and generating a customized traffic guidance message for the selected guidance service and transmitting the same to the corresponding target object at step S250.

A description of the details of the respective steps will be omitted because it is redundant with the description of the apparatus for providing a customized traffic guidance service that was made with reference to FIGS. 2 to 5.

Figure 7:
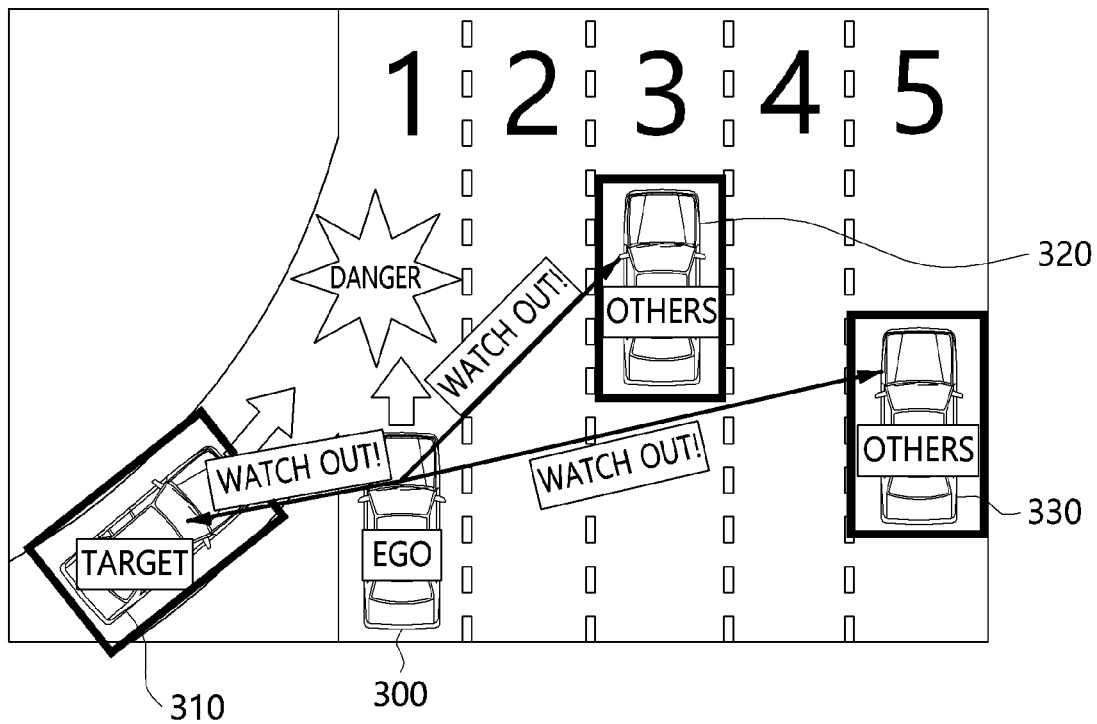
FIG. 7 is an exemplary view for explaining a general traffic safety message provision service.

FIG. 7 is an exemplary view for explaining a general traffic safety message provision service.

Referring to FIG. 7, the case in which, when the ego vehicle 300 is driving near a junction at which two roads meet, the target vehicle 310 enters the junction is illustrated. The ego vehicle 300 detects all of the vehicles 310, 320 and 330 in the vicinity thereof, and when a dangerous situation is detected, the ego vehicle 300 notifies all of the vehicles 310, 320 and 330 of the danger using a broadcast message saying "Watch out".

However, such a passive safety message/service method has a limitation when it is used for complete autonomous driving in a complex driving section in downtown.

Figure 8:
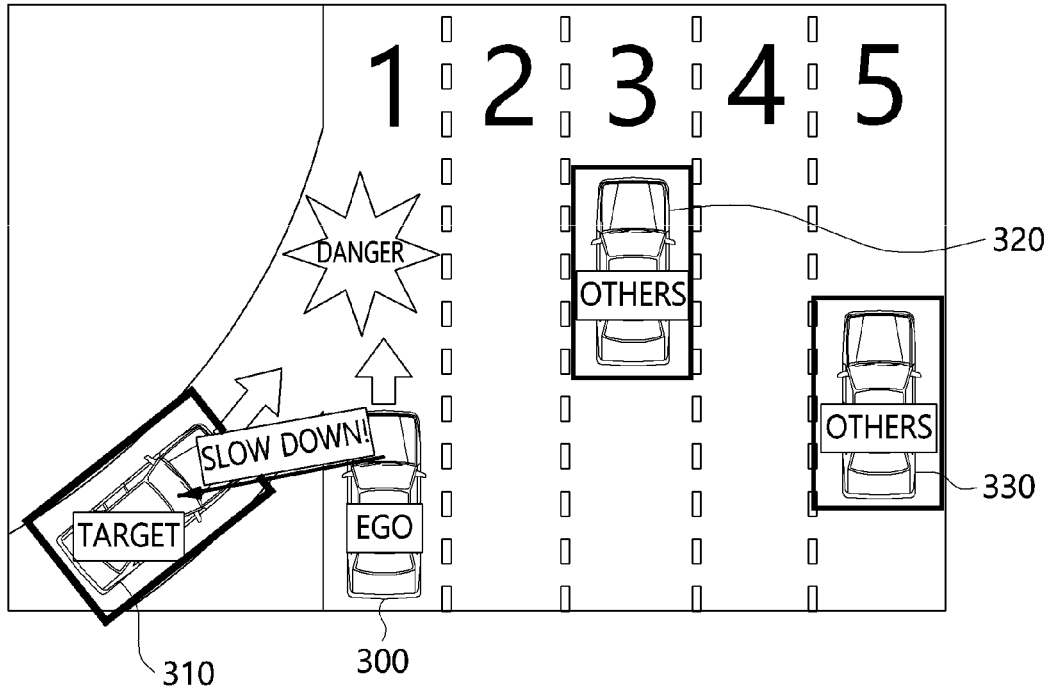
FIG. 8 is an exemplary view illustrating application of a method for providing a customized traffic guidance service according to an embodiment.

FIG. 8 is an exemplary view illustrating implementation of a method for providing a customized traffic guidance service according to an embodiment.

Referring to FIG. 8, like what is shown in FIG. 7, the case in which, when the ego vehicle 300 is driving near a junction at which two roads meet, the target vehicle 310 enters the junction is illustrated. Here, the ego vehicle 300 detects all of the vehicles 310, 320 and 330 in the vicinity thereof. However, the ego vehicle 300 selects only the target vehicle 310, which pertains to the safety thereof, finally selects the target vehicle 310 as the target of a customized traffic guidance service, and transmits a customized traffic guidance message saying "Slow Down" that is suitable for the current traffic condition to the target vehicle 310 in a unicast manner. Accordingly, as if a traffic officer were controlling the traffic flow of vehicles using hand signals, customized traffic guidance may be provided to each vehicle.

Figure 9:
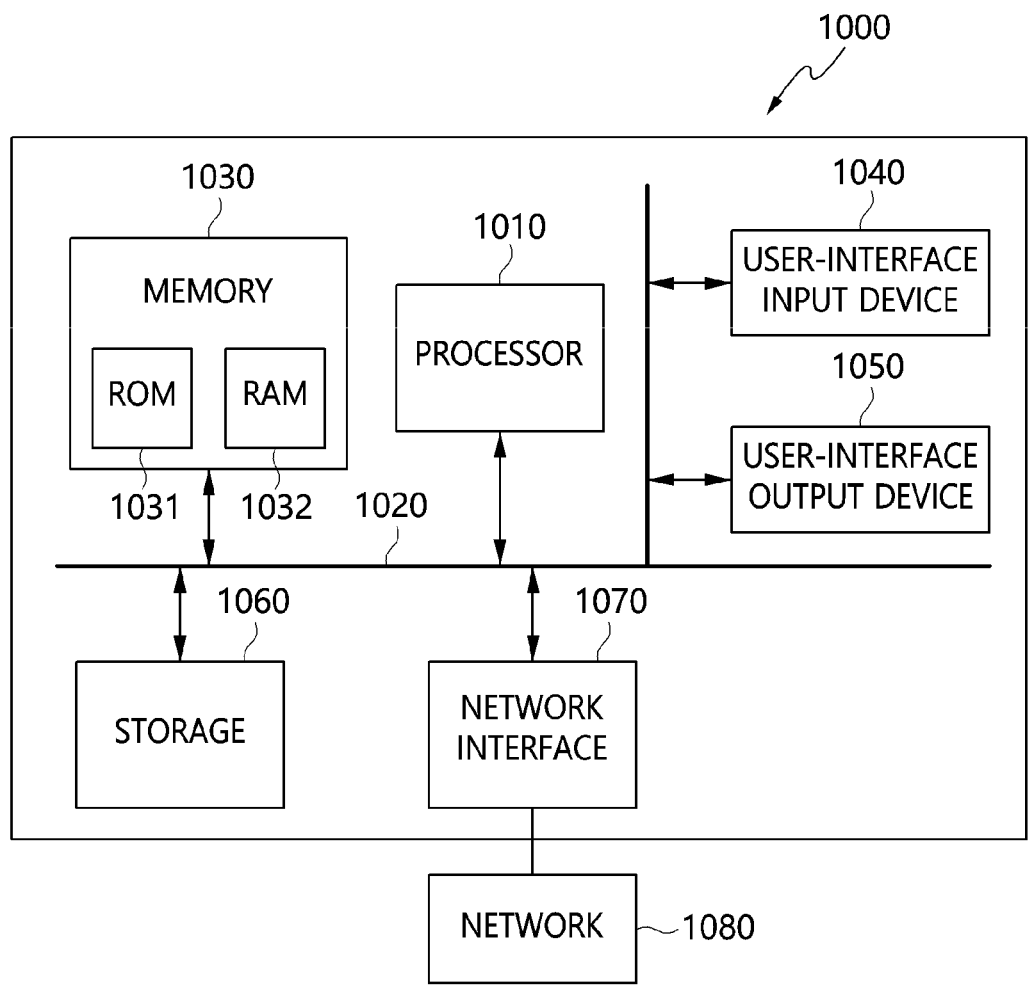
FIG. 9 is a view illustrating a computer system configuration according to an embodiment.

FIG. 9 is a view illustrating a computer system configuration according to an embodiment.

The apparatus for providing a customized traffic guidance service according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, and an information delivery medium. For example, the memory 1030 may include ROM 1031 or RAM 1032.

According to an embodiment, a traffic guidance message is prevented from being transmitted to irrelevant vehicles, whereby effectiveness, safety, and reliability may be maximized.

According to an embodiment, a specific traffic guidance service message based on traffic conditions is delivered to a corresponding user, whereby safety and convenience may be maximized.

Although embodiments of the present invention have been described with reference to the accompanying drawings, those skilled in the art will appreciate that the present invention may be practiced in other specific forms without changing the technical spirit or essential features of the present invention. Therefore, the embodiments described above are illustrative in all aspects and should not be understood as limiting the present invention.

What is claimed is:

1. A method for providing a customized traffic guidance service, comprising:
   acquiring, using at least one sensor and a communication unit, data about one or more nearby objects;
   detecting surrounding traffic conditions based on the data about the nearby objects and determining whether to provide a customized traffic guidance service, using a processor;
   selecting, using the processor, one or more target objects to which the customized traffic guidance service is to be provided and a guidance service to be provided to each of the target objects; and
   generating, using the processor, a customized traffic guidance message for the selected guidance service and transmitting the customized traffic guidance message, through the communication unit, to the corresponding target object,
   wherein determining whether to provide the customized traffic guidance service comprises determining whether an event is occurring based on a result of detecting the surrounding traffic conditions.

2. The method of claim 1, wherein:
   acquiring the data about the one or more nearby objects comprises acquiring first object data based on sensing data acquired using the at least one sensor, and
   determining whether to provide the customized traffic guidance service is configured to determine whether to provide the customized traffic guidance service based on the first object data.

3. The method of claim 2, wherein the at least one sensor is at least one of sensors including a camera, LiDAR and radar.

4. The method of claim 1, wherein:
   acquiring the data about the one or more nearby objects comprises
   acquiring first object data including location information pertaining to each of one or more objects based on the sensing data acquired using the at least one sensor;
   acquiring second object data including location information and address information pertaining to each of one or more objects that transmit messages received by the communication unit; and
   synchronizing the first object data with the second object data based on the location information, and
   selecting the one or more target objects and the guidance service comprises acquiring address information pertaining to each of the target objects based on a result of synchronization.

5. The method of claim 4, wherein the address information includes a MAC address or an IP address.

6. The method of claim 4, wherein:
the first object data is generated as a profile in which a first unique identifier is assigned to each of the one or more objects of the first object data,
the second object data is generated as a profile in which a second unique identifier is assigned to each of the one or more objects of the second object data, and
synchronizing the first object data with the second object data comprises determining whether the object of the first object data is a same as the object of the second object data based on the location information changing over time, which is included in the first object data and the second object data, and generating a profile by assigning a third unique identifier to the first object data and the second object data corresponding to the same object.

7. The method of claim 6, wherein:
the first object data and the second object data further include types of the objects and motion information thereof, and
determining whether the object of the first object data is the same as the object of the second object data is configured to determine whether the object of the first object data is the same as the object of the second object data based on the types of the objects and the motion information thereof.

8. The method of claim 1, wherein transmitting the customized traffic guidance message is configured to transmit the customized traffic guidance message to the corresponding target object in a unicast or multicast manner.

9. An apparatus for providing a customized traffic guidance service, comprising:
memory in which at least one program is recorded;
at least one sensor;
a communication unit; and
a processor for executing the program,
wherein the program performs:
acquiring data about one or more nearby objects through the at least one sensor and the communication unit;
detecting surrounding traffic conditions based on the data about the nearby objects and determining whether to provide a customized traffic guidance service;
selecting one or more target objects to which the customized traffic guidance service is to be provided and a guidance service to be provided to each of the target objects; and
generating a customized traffic guidance message for the selected guidance service and transmitting, through the communication unit, the customized traffic guidance message to the corresponding target object,
wherein determining whether to provide the customized traffic guidance service comprises determining whether an event is occurring based on a result of detecting the surrounding traffic conditions.

10. The apparatus of claim 9, wherein:
acquiring the data about the one or more nearby objects comprises acquiring first object data based on sensing data acquired using the at least one sensor, and
determining whether to provide the customized traffic guidance service is configured to determine whether to provide the customized traffic guidance service based on the first object data.

11. The apparatus of claim 10, wherein the at least one sensor is at least one of sensors including a camera, LiDAR and radar.

12. The apparatus of claim 9, wherein:
acquiring the data about the one or more nearby objects comprises
acquiring first object data including location information pertaining to each of one or more objects based on the sensing data acquired using the at least one sensor;
acquiring second object data including location information and address information pertaining to each of one or more objects that transmit messages received by the communication unit; and
synchronizing the first object data with the second object data based on the location information, and
selecting the one or more target objects and the guidance service comprises acquiring address information pertaining to each of the target objects based on a result of synchronization.

13. The apparatus of claim 12, wherein the address information includes a MAC address or an IP address.

14. The apparatus of claim 12, wherein:
the first object data is generated as a profile in which a first unique identifier is assigned to each of the one or more objects of the first object data,
the second object data is generated as a profile in which a second unique identifier is assigned to each of the one or more objects of the second object data, and
synchronizing the first object data with the second object data comprises determining whether the object of the first object data is a same as the object of the second object data based on the location information changing over time, which is included in the first object data and the second object data, and generating a profile by assigning a third unique identifier to the first object data and the second object data corresponding to the same object.

15. The apparatus of claim 14, wherein:
the first object data and the second object data further include types of the objects and motion information thereof, and
determining whether the object of the first object data is the same as the object of the second object data is configured to determine whether the object of the first object data is the same as the object of the second object data based on the types of the objects and the motion information thereof.

16. The apparatus of claim 9, wherein transmitting the customized traffic guidance message is configured to transmit the customized traffic guidance message to the corresponding target object in a unicast or multicast manner.

17. A method for providing a customized traffic guidance service, comprising:
acquiring first object data for each of one or more objects recognized based on sensing data acquired using at least one sensor;
detecting surrounding traffic conditions based on the first object data and determining whether to provide a customized traffic guidance service;
selecting one or more target objects to which the customized traffic guidance service is to be provided and a guidance service to be provided to each of the target objects;
acquiring second object data including location information and address information pertaining to each of one or more objects that transmit messages received by a communication unit;
synchronizing the first object data with the second object data based on the location information;
acquiring address information of each of the target objects based on a result of synchronization; and generating a customized traffic guidance message for the selected guidance service and transmitting, through the communication unit, the customized traffic guidance message to the address information of the corresponding target object.

18. The method of claim 17, wherein:

the first object data is generated as a profile in which a first unique identifier is assigned to each of the one or more objects of the first object data, the second object data is generated as a profile in which a second unique identifier is assigned to each of the one or more objects of the second object data, and synchronizing the first object data with the second object data comprises determining whether the object of the first object data is a same as the object of the second object data based on the location information changing over time, which is included in the first object data and the second object data, and generating a profile by assigning a third unique identifier to the first object data and the second object data corresponding to the same object.

19. The method of claim 18, wherein:

the first object data and the second object data further include types of the objects and motion information thereof, and determining whether the object of the first object data is the same as the object of the second object data is configured to determine whether the object of the first object data is the same as the object of the second object data based on the types of the objects and the motion information thereof.

20. The method of claim 17, wherein transmitting the customized traffic guidance message is configured to transmit the customized traffic guidance message to the address information of the corresponding target object in a unicast or multicast manner.

* * * * *